(12) United States Patent
O'Daniel (10) Patent No.: US 6,736,585 B2
(45) Date of Patent: May 18, 2004

(54) CONTAINER SAFETY LATCH (75) Inventor: Harold W. O'Daniel, Mansfield, TX (US)

(73) Assignee: G & H Manufacturing, Ltd., Arlington, TX (US)

( * ) Notice: Subject to any disclaimer, the term of this patent is extended or adjusted under 35 U.S.C. 154(b) by 8 days.

(21) Appl. No.: 09/855,387

(22) Filed: May 15, 2001

(65) Prior Publication Data

US 2002/0172583 A1 Nov. 21, 2002

(51) Int. Cl.$^7$ ................................................. B60P 7/08
(52) U.S. Cl. ........................................ 414/498; 410/94
(58) Field of Search ............................... 414/484, 498, 414/499, 500, 809, 812, 813; 410/80, 69, 94

(56) References Cited

U.S. PATENT DOCUMENTS

| | | | |
|---|---|---|---|
| 3,897,882 A | | 8/1975 | Budoff |
| 4,415,298 A | * | 11/1983 | Voigt ........................... 410/69 |
| 4,875,111 A | * | 10/1989 | Odaka et al. ........... 414/350 X |
| 5,171,119 A | * | 12/1992 | Carson ........................ 414/408 |
| 5,362,184 A | | 11/1994 | Hull et al. ..................... 410/90 |
| 5,588,712 A | * | 12/1996 | Brooks ...................... 298/22 C |
| 5,785,473 A | * | 7/1998 | Stark ............................ 410/94 |
| 5,816,758 A | * | 10/1998 | Huber .......................... 410/77 |
| 6,053,692 A | | 4/2000 | Mason et al. ................ 414/498 |

OTHER PUBLICATIONS

PG Publication 2002/0130488A1 (Sep. 19, 2002); filed Mar. 16, 2001; copy in 280/421.*

* cited by examiner

Primary Examiner—Eileen D. Lillis
Assistant Examiner—Charles Fox
(74) Attorney, Agent, or Firm—Charles D. Gunter, Jr.

(57) ABSTRACT

A device for securing a refuse container to a tilt frame of a refuse hauling truck. The device comprising a latch assembly including at least two latch bars, pivotally mounted on the tilt frame for releasably engaging the container. The latch bars being pivotable between a container engaging position and a disengaged position. An actuator switch is used to activate an associated pneumatic system which pivots the latching bars to engage the container and prevent further movement of the container.

7 Claims, 7 Drawing Sheets

CONTAINER SAFETY LATCH

BACKGROUND OF THE INVENTION

1. Technical Field

The present invention relates generally to vehicles used for loading, unloading and transporting containers, such as refuse containers, over a roadway and, particularly, to a device for such vehicles for automatically securing the container to the bed or chassis of the vehicle to prevent shifting during transport.

2. Description of the Related Art

A variety of truck and/or trailer devices are known in the prior art for loading, transporting and unloading refuse and recycling type containers. These refuse and recycling containers, referred to collectively herein as "refuse" containers, are typically steel boxes with or without tops. The containers are sometimes lifted from, e.g., a site adjacent a retail store, for loading onto a truck for transport to a dump or recycling location.

Other known transport devices used in the industry include trailers which are used for transporting removable containers between job sites, storage terminals, dumping sites and the like. The trailers are towed by tractors and are equipped with hydraulic or electrical systems for loading, unloading or otherwise handling the containers. For example, an empty refuse container might be transported from a storage terminal to a job location where the container is left behind for the collection of refuse. A full container might be loaded and transported to a dumping site or back to a storage terminal. While the present invention is most often applied to refuse transport "trucks," the terms "truck" and "vehicle" are also intended to encompass trailers since the operation of the invention is the same in either case.

Trucks of the above type are typically provided with an undercarriage or chassis carrying a tilt frame. The tilt frame is movable between a horizontal position for transport and a tilted or inclined position for loading, unloading and/or dumping the container contents. In the inclined position, the tilt frame defines a ramp onto which a container resting on the ground can be hoisted. When the tilt frame is lowered back to its level position, the truck can be used to transport the container over, e.g., a roadway. To unload the container from the truck, the tilt frame is tilted again to allow the container to slide down the inclined surface of the tilt frame onto a surrounding substrate. The unloading operation is typically accomplished through the use of a taut cable and winch arrangement or similar devices.

The containers which are transported are relatively large and generally rectangular having a width comparable to the width of the tilt frame of the truck. The length of the tilt frame may accommodate only one container or multiple containers. The standard container used in the industry has underside, spaced-apart parallel rail members for engaging the chassis or tilt frame and enabling loading and unloading of the container relative to the tilting frame. The container also has a plurality of spaced channel members on the underside thereof which are arranged perpendicular to the rail members and comprise additional structural support for the container body.

While the weight of a loaded container is usually sufficient to keep the container in place for transport on the truck, sometimes it is desirable to secure the container to the truck chassis and thereby prevent any undesired shifting or sliding of the container during transport. A common means of securing a container on such a vehicle to prevent its undesired movement involves the utilization of a nylon strap and ratchet mechanism. Such a mechanism is located along the chassis and has a hook at the end of the nylon strap for engaging the container whereby tension on the strap tends to bind the container to the chassis. The use of the mechanism is optional to the operator who must manually engage and disengage it. A large container may utilize four or more such mechanisms, disposed in equal number in spaced-apart relation along each side of the truck chassis, requiring the truck operator to manipulate and secure each mechanism prior to receptacle transport, and then to release each mechanism prior to receptacle unloading.

What is needed is a system that is easily actuated by an operator and which will secure the container even though at least a portion of the securing means is obstructed by one of the channel members located on the container underside.

BRIEF SUMMARY OF THE INVENTION

It is an object of the present invention to provide a container transport vehicle with a device which serves as a positive means for securing or locking the container in a stationary position during transport.

It is another object of the present invention to provide a latching means for securing a container to a tilting frame-type truck that is easily actuated by an operator at the loading or unloading location with a minimum of physical effort.

It is yet another object of the present invention to provide a means of securing a container to a tilting frame vehicle such that despite one latch bar being obstructed by a channel member, a second latch bar will still engage the container and prevent undesired movement of the container.

The above objects are achieved by providing a truck of the type having a chassis equipped to load, transport, and unload a refuse container by utilization of a tilt frame extending longitudinally on the chassis. The container having underside spaced-apart parallel rail members for engaging the frame and enabling loading and unloading of the container relative to the tilting frame. The container also has a plurality of channel members arranged perpendicular to the rail members on the underside of the container. The improvement comprises a device for securing the refuse container to the tilt frame, the device comprising a latch assembly including at least two latch bars, pivotally mounted on the chassis for releasably engaging the container. The latch bars are pivotable between a container engaging position and a disengaged position. A pneumatic circuit and pneumatic cylinders communicate with the existing power take off system of the truck, whereby actuation of the pneumatic cylinders moves the latch bars to either the engaged or disengaged position.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

DETAILED DESCRIPTION OF THE PREFERRED EMBODIMENT

Figures 1, 1A:
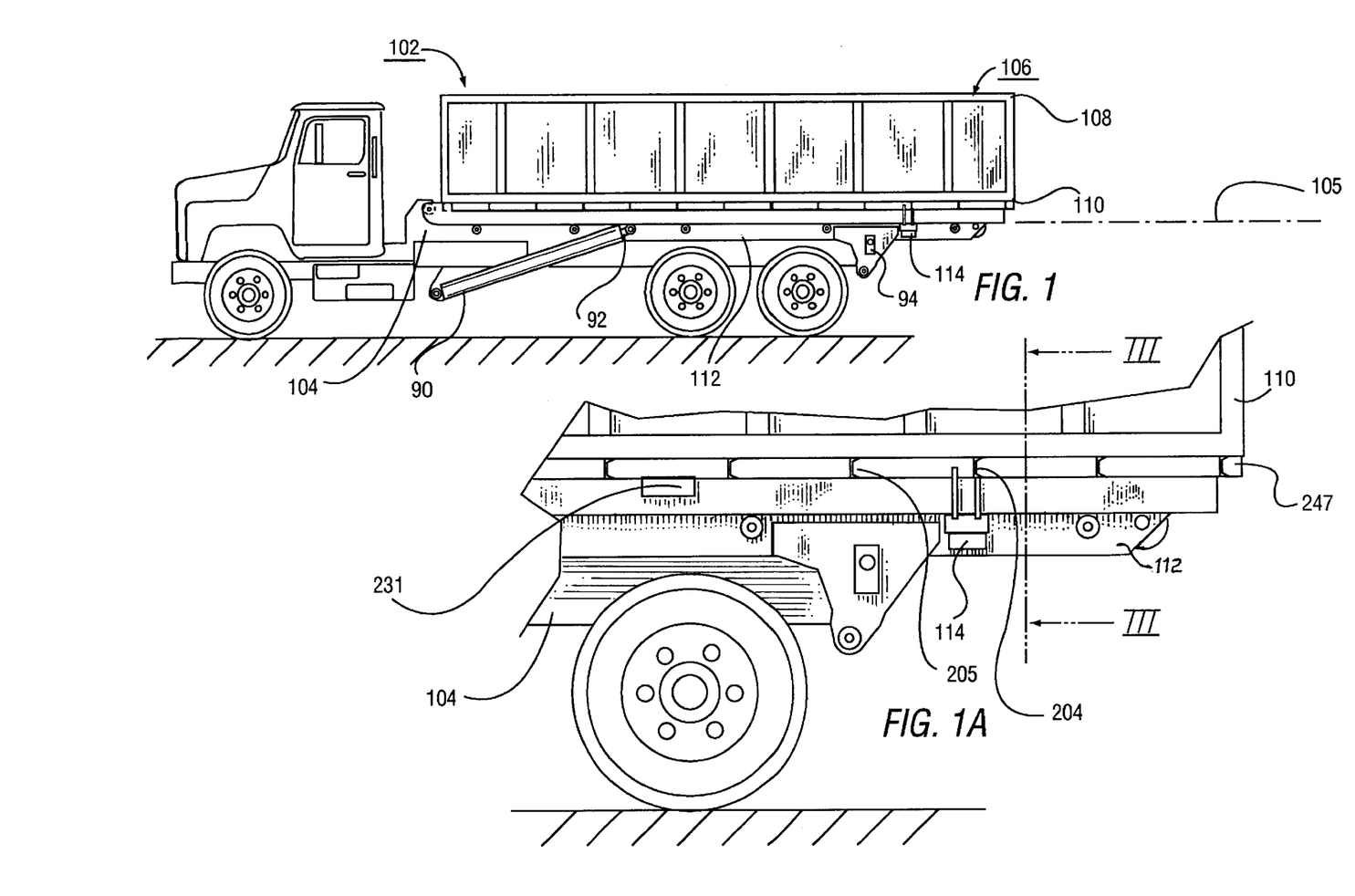
FIG. 1 is a side elevational view of a transport vehicle utilizing the safety device of the present invention.
FIG. 1A is a close up elevational view of the chassis and tilt frame of the vehicle FIG. 1.

FIG. 1 depicts a side view of a transport vehicle of the invention, designated generally as 102. The truck 102 includes an undercarriage or chassis 104 which is equipped to load, transport, and unload a container 106 by utilization of the tilt frame 112 which extends longitudinally on the chassis 104 along the longitudinal axis 105 when in the loaded or rest position. A pivot means is provided for pivoting the tilt frame 112 relative to the chassis 104 to a second, tilted position (not shown). In FIG. 1, the pivot means includes at least one hydraulic cylinder 90 having an associated output shaft 92, a selected one of the cylinder and output shaft being connected to the main chassis 104, the other of the cylinder and shaft being connected to the tilt frame 112 for pivoting the tilt frame and its associated container about a pivot point 94 located on the main chassis.

Figure 4:
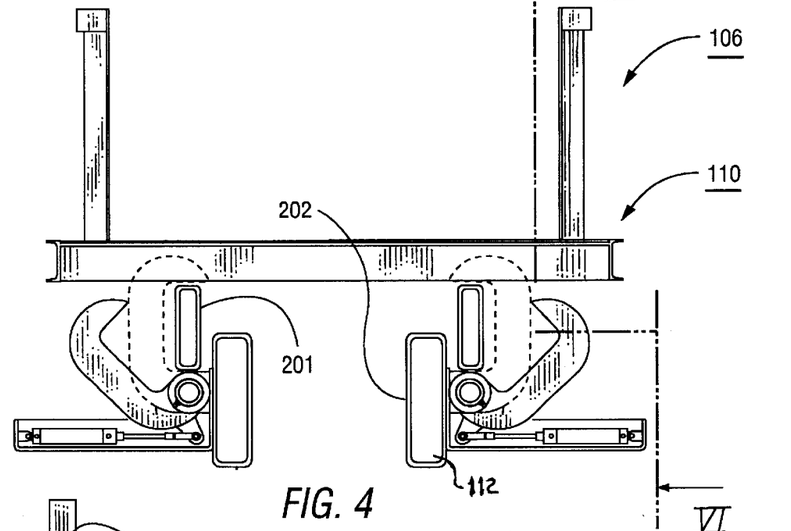
FIG. 4 is a cut away view taken along the horizontal axis of the vehicle bed of the invention again showing a latch bar moving from the disengaged to the engaged positions and a container aligned with the chassis.
Figure 6:
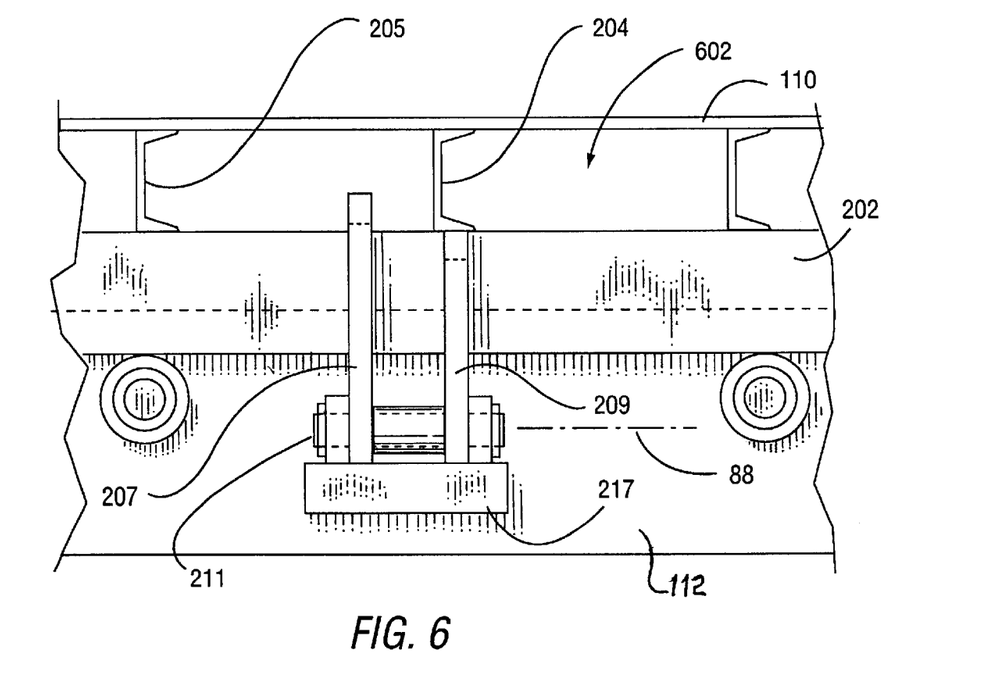
FIGS. 6 and 6A are isolated, operational views showing the movement of the latch bar with one latch bar being obstructed by a channel member in FIG. 6 and both latch bars being free to move in FIG. 6A.

The container 106 is a standard container typically found in the industry for hauling refuse and has a top portion 108 and a bottom portion 110. FIG. 6 illustrates a cut away view of the container 106 with the bottom portion 110 having longitudinally-extending spaced-apart skid rails 201, 202 (FIGS. 4 and 6) secured to its undersurface for engaging the tilt frame 112 and enabling loading and unloading of the container relative to the tilt frame 112. The structure of the bottom portion 110 of the container 106 also includes a plurality of perpendicularly arranged channel members (204, 205 in FIG. 6) defining, between each pair of such channel members 204, 205 a space 602 above the skid rails 201, 202. The container 106 is commercially available, and, accordingly, is known prior art.

Figure 2:
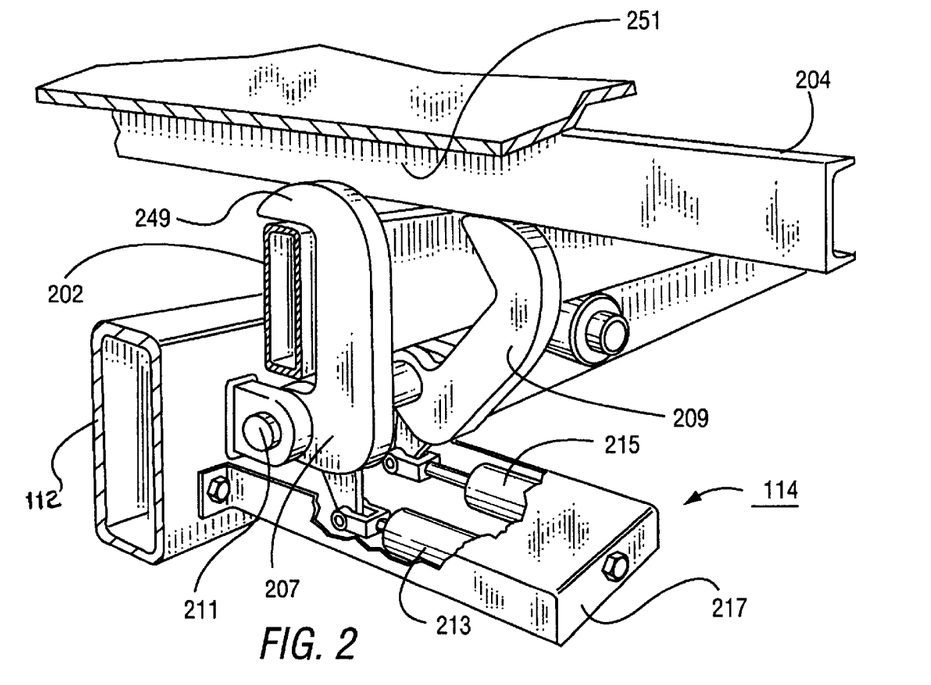
FIG. 2 is an isolated view of the safety device of the invention in use with one latch bar of the device being obstructed by a channel member.
Figure 3:
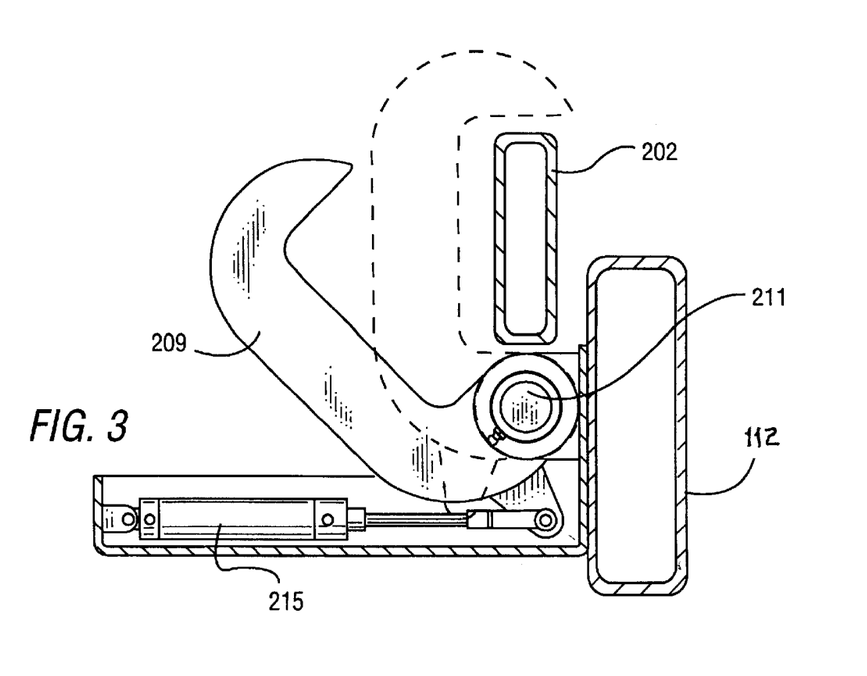
FIG. 3 is a side view of a latch member moving from the disengaged position, shown in solid lines, to the engaged position, shown in dotted lines, the view being taken along lines III—III in FIG. 1A.

The transport vehicle of the invention includes a safety latch assembly 114 (FIG. 1) mounted on the truck chassis, a preferred form of the assembly being shown in broken away fashion in FIG. 2. The latch assembly includes a pair of pivotally mounted latch bars 207, 209. Although the latch bars 207, 209 are shown located near the rear of the truck in FIGS. 1 and 1A, it will be understood that the bars 207, 209 could extend from any point on the chassis 104 that would allow the latch bars to be in spaced relation with the container 106 and allow performance of the essential functions of the invention. In the embodiment of FIG. 2, the latch assembly includes latch bars 207, 209 of a generally C-shaped profile pivotally mounted on a horizontal bar 211 affixed to the tilt frame 112. The latching bars 207, 209 are pivotable between the container engaging position shown in dotted lines in FIG. 3 and a disengaged position shown in solid lines in FIG. 3 by means of pneumatic cylinders 213, 215 mounted in a holding tray 217. When the latching bars 207, 209 are in the disengaged position, they are entirely clear of the container 106 during the loading operation.

The latch bars 207, 209 (FIG. 6) are spaced-apart a preselected distance along the horizontal axis 88 of the horizontal bar 211. This distance is selected so that even if one latch bar happens to engage a channel member (204 in FIG. 6), the remaining latch bar will be spaced sufficiently to be received in the opening or space 602 as the latch bars move from the disengaged to the engaged positions.

Figure 7:
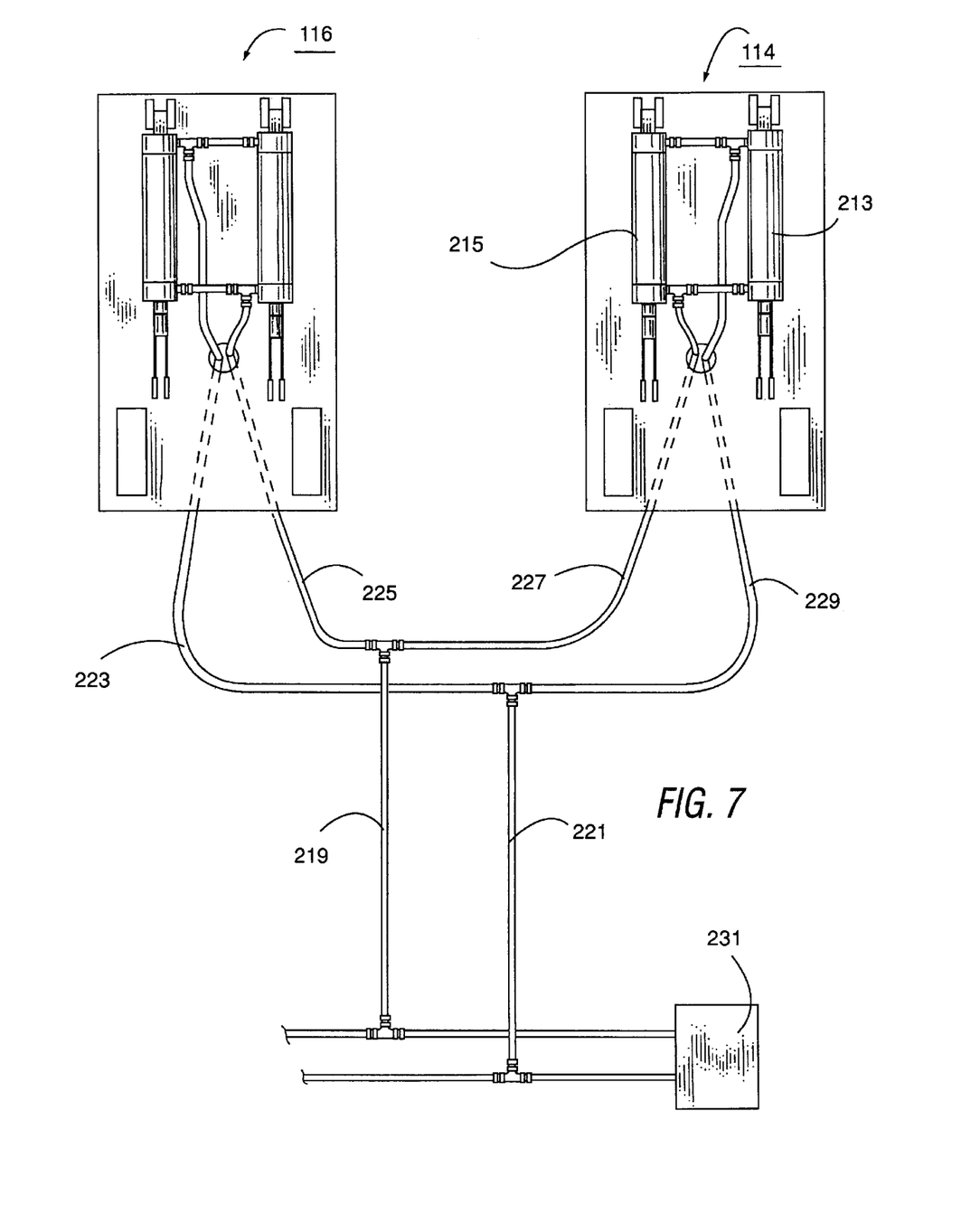
FIG. 7 is a simplified, schematic view of the pneumatic system which is used to supply the operative force to the latch members of the device of the invention.

FIG. 7 is a simplified view of the pneumatic system used to power the cylinders 213, 215 to move the latch bars between the engaged and disengaged positions. In the embodiment illustrated in FIG. 7, a pair of latch assemblies 114, 116 are arranged on opposite sides of the truck chassis 104. While the invention is described in terms of a "pneumatic" system, it will be understood that a "hydraulic" system could also be utilized, the two fluid operated systems being generally interchangeable. The system illustrated in FIG. 7 uses pneumatic pressure that is normally used as a signal pressure at the power take off (PTO) unit of the vehicle for engaging and disengaging the PTO. Engagement of the PTO provides the power for the hydraulic motor which is used to power the main tilting and lifting mechanisms of the vehicle. These systems are commercially available on trucks sold by G&H Manufacturing Ltd. and do not form a part of the present invention.

The PTO switch is illustrated in simplified fashion as block 231 in FIG. 7, it being understood that this switch is normally located in the cab of the transport vehicle for actuation by the operator. To begin the loading operation, the vehicle operator would normally turn on the switch 231 to engage the PTO. This action causes pneumatic pressure to be routed through the lines 219, 221 and lines 223, 225, 227 and 229 to power (i.e., extend) the respective cylinders and move the latch arms 213, 215 to the disengaged position. The operator would then operate the truck tilt mechanism and hoist to pull a container onto the tilt frame and then lower the tilt frame relative to the truck chassis. When the operator is ready to drive away from the location, the switch 231 is moved in the opposite direction in order to remove the pneumatic signal pressure at the PTO to turn the PTO off. This action simultaneously causes the pneumatic pressure at the latch mechanisms to move the latch arms to the fully engaged position. Thus, the cylinders are retracted to lock the latch arms in the engaged position. The extended and retracted positions of the cylinders are perhaps best seen in FIGS. 2 and 3.

Figure 5:
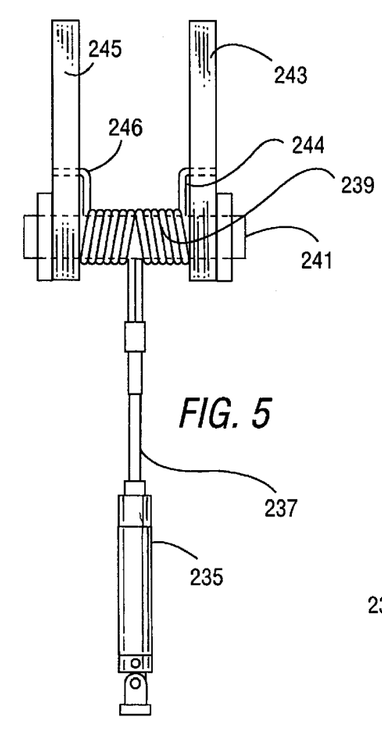
FIGS. 5 and 5A are side views of an alternative latch member arrangement in which a single cylinder and spring arrangement is used to pivot a pair of latch bars.
Figure 5A:
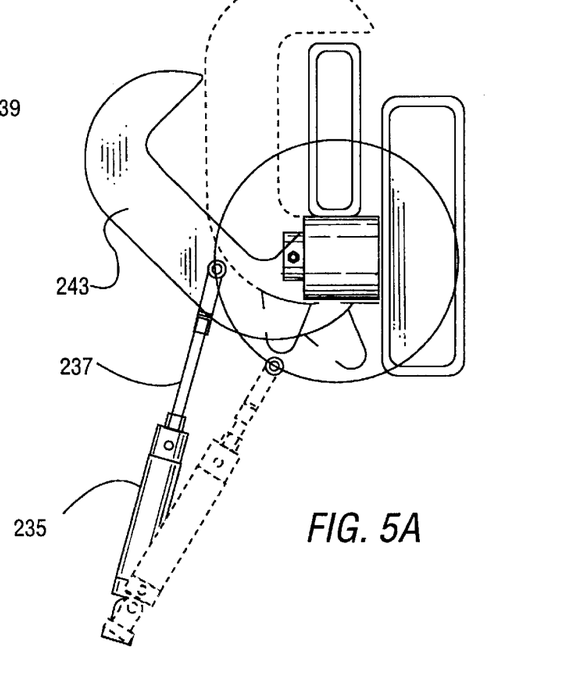

FIGS. 5 and 5A show another embodiment of the cylinder arrangement used to actuate the latch bars of the latch assembly of the invention. In the embodiment of FIGS. 5 and 5A, a single cylinder 235 has an output shaft 237 which engages a coil spring 239. The coil spring is engaged upon the horizontal pivot bar 241, and has oppositely arranged outer extents 244, 246 which engage the latch bars 243, 245 whereby movement of the piston shaft 237 serves to pivot the latch bars 243, 245 simultaneously between the disengaged and engaged positions. If either latch bar 243, 245 contacts a channel 204, 205, the spring 239 allows the opposite latch bar to move to the full engaged position shown in dotted lines in FIG. 5A.

Figure 8:
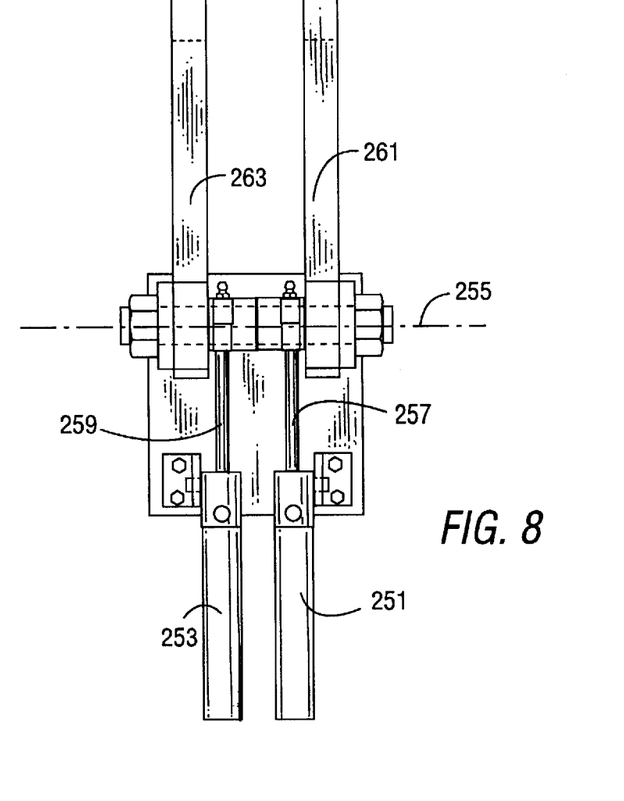
FIGS. 8 and 8A are top and side views of another latch member arrangement used in the present invention.
Figure 8A:
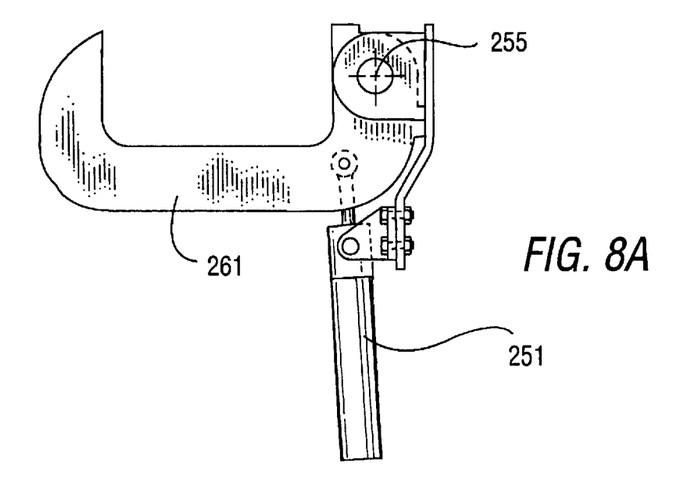

FIGS. 8 and 8A show another cylinder and latch arrangement useful for purposes of the invention. In this arrangement, cylinders 251, 253 are mounted on the truck chassis 104 generally perpendicular to a longitudinal axis 255 drawn parallel to the truck longitudinal axis 105, thereby presenting a lower protruding profile with respect to the truck chassis. The output shafts 257, 259 pivot the latch bars 261, 263 about the axis 255 between the previously described engaged and disengaged positions. As shown in FIG. 8A, the C-shaped latch bars 261 moves 90 degrees apart from the engaged position of FIG. 8 to the disengaged position. This moves the latch bar even further away from the container when not in use.

Figure 9:
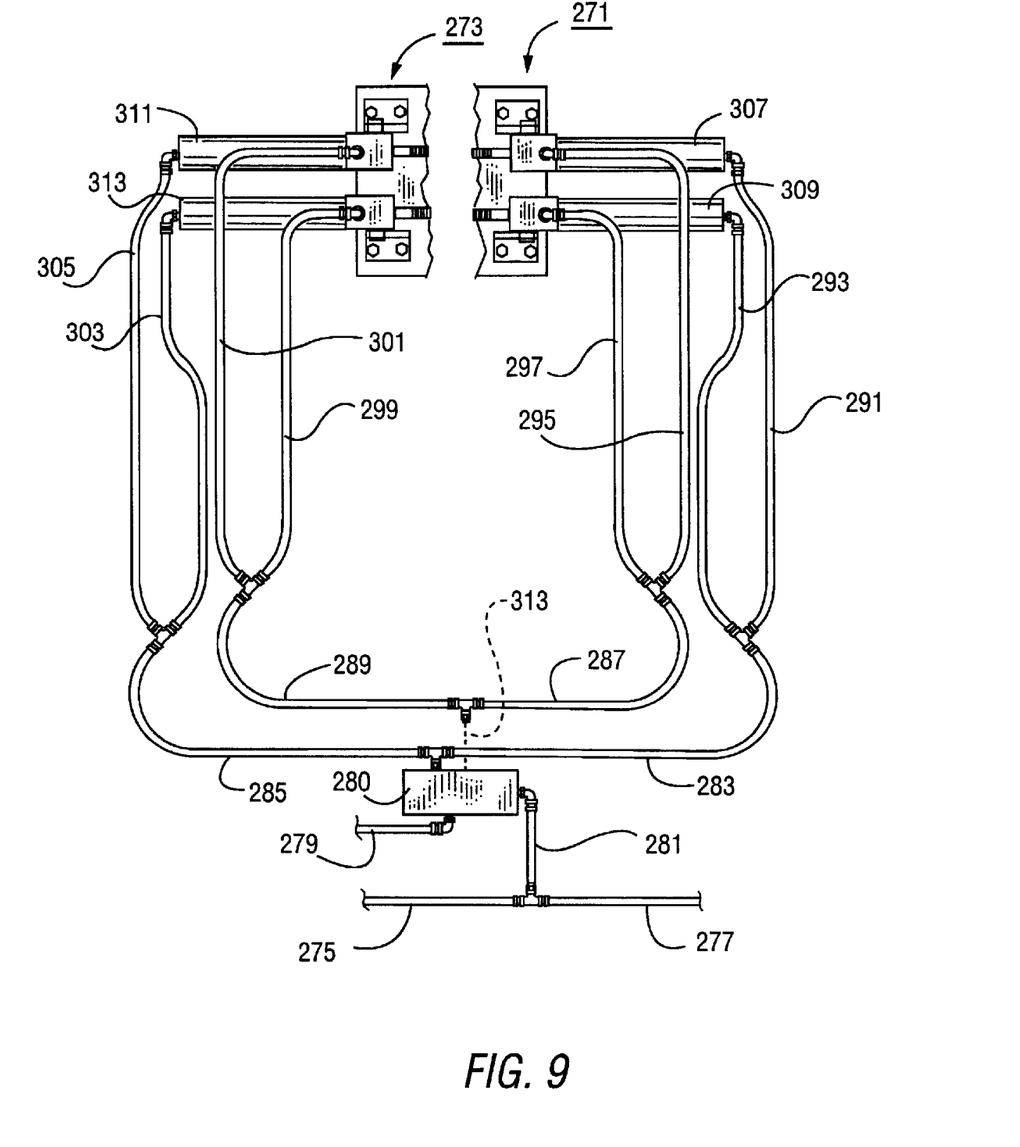
FIG. 9 is a schematic view, similar to FIG. 7, of a pneumatic system which is used with the alternate latch member arrangement of FIGS. 8 and 8A.

FIG. 9 shows a pneumatic circuit used with a pair 271, 273 of the cylinder and latch assemblies such as described with respect to FIGS. 8 and 8A. In the pneumatic circuit of FIG. 9, pneumatic pressure is supplied through conduit 279 to the shuttle valve 280 shown in a first position to in FIG. 9. Air is also being routed to the PTO switch 231 through conduit 275 and from the PTO switch 231 through conduit 277. Air in conduit 281 is blocked by valve 280. Air in conduit 279 is routed through conduits 283, 285 and associated conduits 291, 293 and 303, 305 to one end of the cylinders 307, 309, 311, 313. This action extends the cylinders to the locked or engaged positions. Movement of the shuttle valve 280 to the position opposite that shown in FIG. 9 causes conduits 283, 285 to be blocked off and air to be supplied through the valve and through dotted line 313 to conduits 287, 289. These conduits communicate through lines 295, 297 and through lines 299, 301 with the opposite ends of the cylinders to thereby move the cylinders to the unlocked or disengaged position. In this way, the operation of the pneumatic system is exactly opposite that described with respect to the system shown in FIG. 7.

Figure 6A:
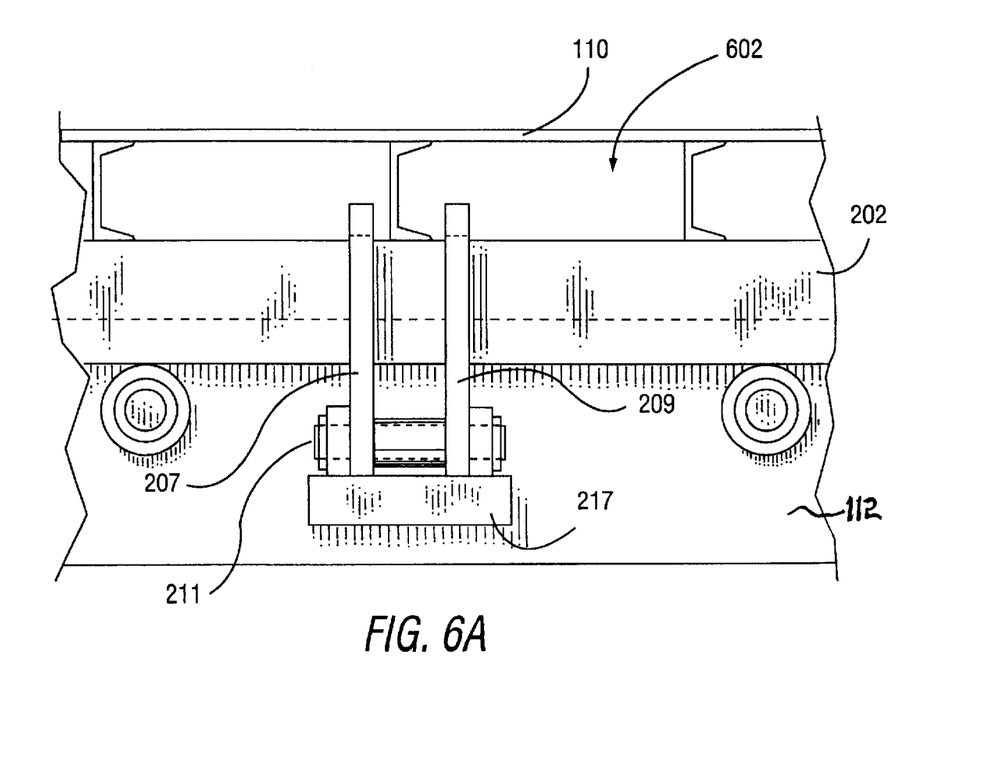

The operation of the safety latch of the invention will now be described. As best seen in FIGS. 1A, 6 and 6A, the underside of the container 106 is designed whereby its side rails 201, 202 are appropriately spaced to straddle the tilt frame 112 and are supported on a series of spaced apart rollers carried on the chassis which form a top support surface for the container. Sometimes, the container 106 will tend to shift longitudinally on the top support surface of the vehicle during transport. To prevent this, the truck operator uses the PTO switch located in the truck cab to activate the latch bars (207, 209 in FIG. 2), causing the latch bars to pivot from the disengaged position to the container engaging position, whereby a top portion 249 of the C-shaped latch bar engages the planar surface 251 of the container channel member to prevent any further longitudinal movement of the container. As shown in FIG. 2, the latch bar 207 projects over the rail 202 and into space 602 (FIG. 6) above the skid rails 202 to prevent further movement of the container 106 past the top portion 249. The C-shaped latch bar 207 also engages the tilt frame 202 to further secure the tilt frame in the horizontal or rest position.

The safety device can be disengaged by use of the PTO switch, as previously described, whereby an operator can reverse the flow of pneumatic pressure and return the latch bars 207, 209 to the disengaged position. Also, the device 114 can be designed and adapted to automatically disengage from the engaged position as an incident or function of the frame 112 being tilted from its horizontal disposition as shown in FIG. 1 to a tilted unloading position. Or, alternatively, to automatically engage as an incident or function of the frame 112 being tilted from its loading position to a horizontal disposition as shown in FIG. 1.

The latching bars 207, 209 are thus orientated such that if one latch bar 209 is obstructed by a channel member 204, that the other latch bar 207 will be unobstructed and can engage the container 106 and project over the rail 202 and into space 602 thereby preventing farther movement of the container 106. FIG. 2 is an illustrative example of the situation in which the latch bar 207 is in the engaged position but with latch bar 209 being obstructed by the channel member 204. As can be seen in FIG. 2, despite latch bar 209 being obstructed, latch bar 207 can still project over the rail 202 and into space 602 and prevent further movement of container 106.

An invention has been provided with several advantages. The safety device of the invention is simple in design and economical to manufacture. The device can be operated by using the pneumatic signal pressure which is present at the PTO switch in the cab of the truck to extend and retract the pneumatic cylinders used to move the latch bars between the engaged and disengaged positions. The device does not require the use of the down straps or require manual effort on the part of an operator in securing such straps. The device is extremely reliable in operation due to its sturdy construction and simplicity of operation.

Although the device of the invention herein described is intended primarily for use with a truck of the type having a tilting frame to load, unload, and transport large refuse containers, it should be recognized that vehicles other than trucks can be equipped with a tilting frame to transport containers or other large equipment. For example, the device herein described could be adapted to a tilting frame on a railroad car, a barge, or even a large transport aircraft utilizing a tilting frame as a loading means.

Moreover, while the foregoing description basically describes the preferred embodiment of an inventive device, it will be understood by those skilled in the art that modifications embodied in various forms may be made without departing from the spirit and scope of the invention as defined in the following claims.

What is claimed is:

1. A transport vehicle equipped to load, transport, and unload a plurality of different types and sizes of refuse containers, each container having underside spaced-apart parallel rail members and perpendicularly arranged channel members, the vehicle comprising:

a main vehicle chassis which is supported upon associated axles and wheels, the vehicle including a power transport means for transporting the chassis to a desired location;

a tilt frame pivotally mounted on the main vehicle chassis;

pivot means operatively connected between the main vehicle chassis and the tilt frame for pivoting the tilt frame and its associated container about a pivot point located on the main vehicle chassis;

at least one latch assembly pivotally mounted on a selected one of the tilt frame and the vehicle chassis for releasably engaging a selected container, the latch assembly being pivotable between a container engaging position and a disengaged position;

a fluid powered cylinder system located on the vehicle in fluid communication with the latch assembly for pivoting the latch assembly between the engaged and disengaged positions; and wherein at least a first and second latch bar are included in each latch assembly as simultaneously actuable mating pairs, the latch bars being mounted at a selected location on the selected tilt frame and vehicle chassis along a longitudinal axis thereof, the latch bars being pivotable generally perpendicular to the tilt frame and vehicle longitudinal axis simultaneously upon actuation of the fluid powered cylinder system, the latch bars being spaced apart a preselected distance relative to the longitudinal axis of the tilt frame and vehicle chassis, the distance being greater than the width of a container channel member, the latch bars being orientated such that if the first latch bar is obstructed by a channel member during movement of the latch bar between the container disengaging position and the container engaged position, the second latch bar is unobstructed and can engage the container and prevent further movement of the container.

2. The transport vehicle of claim 1, wherein the pivot means comprises at least one hydraulic cylinder having an associated output shaft, a selected one of the cylinder and output shaft being connected to the main chassis, the other of the cylinder and shaft being connected to the tilt frame for pivoting the tilt frame and its associated container about the pivot point located on the main chassis.

3. The transport vehicle of claim 2, wherein the container rail members are spaced apart a preselected distance to allow the container to slide along the longitudinal axis of the tilt frame between a first rest position and a second shifted position.

4. The transport vehicle of claim 1, wherein the latch bars are generally C-shaped.

5. The transport vehicle of claim 4, wherein the fluid powered cylinder system is a pneumatic system, the system further comprising:

an operator control for the pneumatic system, manual manipulation of the operator control serving to reverse the supply of pneumatic pressure to the pneumatic system to retract the once engaged latching bars to the disengaged position.

6. The transport vehicle of claim 5, wherein the operator control is the PTO switch located on the vehicle and wherein a portion of a pneumatic signal normally supplied to the PTO switch is routed to the pneumatic system of the latching assembly in order to actuate the latching assembly.

7. In combination, a transport vehicle and at least one refuse container, the transport vehicle being equipped to load, transport, and unload a plurality of different types and sizes of refuse containers, each container having underside spaced-apart parallel rail members and perpendicularly arranged channel members, the combination comprising:

a main vehicle chassis which is supported upon associated axles and wheels, the vehicle including a power transport means for transporting the chassis to a desired location;

a tilt frame pivotally mounted on the main vehicle chassis;

pivot means operatively connected between the main vehicle chassis and the tilt frame for pivoting the tilt frame and its associated container about a pivot point located on the main vehicle chassis;

at least one latch assembly pivotally mounted on a selected one of the tilt frame and the vehicle chassis for releasably engaging a selected container, the latch assembly being pivotable between a container engaging position and a disengaged position;

a fluid powered cylinder system located on the vehicle in fluid communication with the latch assembly for pivoting the latch assembly between the engaged and disengaged positions; and wherein at least a first and second latch bar are included in each latch assembly as simultaneously actuable mating pairs, the latch bars being mounted at a selected location on the selected tilt frame and vehicle chassis along a longitudinal axis thereof, the latch bars being pivotable generally perpendicular to the tilt frame and vehicle longitudinal axis simultaneously upon actuation of the fluid powered cylinder system, the latch bars being spaced apart a preselected distance relative to the longitudinal axis of the tilt frame and vehicle chassis, the distance being greater than the width of the container channel members of any of the different types and sizes of containers being transported, the latch bars being orientated such that if the first latch bar is obstructed by a channel member during movement of the latch bar between the container disengaging position and the container engaged position, the second latch bar is unobstructed and can engage the container and prevent further movement of the container.

* * * * *